(12) United States Patent
Hazra et al.

(10) Patent No.: US 6,898,319 B1
(45) Date of Patent: May 24, 2005

(54) METHOD AND SYSTEM FOR VIDEO FRAME ENHANCEMENT USING EDGE DETECTION

(75) Inventors: Rajeeb Hazra, Beaverton, OR (US); Ravi K. Sharma, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/151,555

(22) Filed: Sep. 11, 1998

(51) Int. Cl.$^7$ .............................. G06T 5/00; G06T 9/00
(52) U.S. Cl. ...................... 382/232; 382/199; 382/261; 382/268; 358/426.12; 375/240.29
(58) Field of Search ................. 358/426.12; 382/233, 382/239, 268, 232, 254, 260, 266, 199, 234, 242, 243, 261, 269, 275; 348/845; 375/240.26, 240.29

(56) References Cited

U.S. PATENT DOCUMENTS

| | | | |
|---|---|---|---|
| 3,035,121 A | * 5/1962 | Schreiber | 348/397.1 |
| 4,870,497 A | * 9/1989 | Chamzas et al. | 358/426 |
| 5,359,676 A | * 10/1994 | Fan | 382/260 |
| 5,694,487 A | * 12/1997 | Lee | 358/268 |
| 5,701,368 A | * 12/1997 | Jung | 382/239 |
| 5,757,972 A | * 5/1998 | Murayama | 382/232 |
| 5,821,986 A | * 10/1998 | Yuan et al. | 382/254 |
| 5,832,115 A | * 11/1998 | Rosenberg | 382/266 |
| 5,878,172 A | * 3/1999 | Go | 382/266 |
| 5,984,514 A | * 11/1999 | Greene et al. | 382/232 |
| 6,370,279 B1 | * 4/2002 | Paik | 382/268 |

OTHER PUBLICATIONS

Jain, Anil, Fundamentals of Digital Image Processing, Prentice Hall, pp. 249–251 and 347–355.

* cited by examiner

Primary Examiner—Scott A. Rogers
(74) Attorney, Agent, or Firm—Sharon Wong

(57) ABSTRACT

Briefly, in accordance with one embodiment of the invention, a video processing system includes: a video coder. The video coder includes the capability to generate an edge detection map along a predetermined direction for an uncoded frame that is to be coded.

Briefly, in accordance with another embodiment of the invention, an article includes: a storage medium having stored thereon instructions capable of being executed by a system that when executed result in: producing an edge detection map along a predetermined direction from the video frame prior to coding; and coding the edge detection map and the video frame.

Briefly, in accordance with one more embodiment of the invention, a method of processing a video frame includes: producing an edge detection map along a predetermined direction from the video frame prior to coding; and coding the edge detection map and the video frame.

Briefly, in accordance with still one more embodiment of the invention, a video processing system includes: a video frame processor to generate an edge detection map from an uncoded video frame to be coded, the video frame processor further including the capability to code the edge detection map.

27 Claims, 3 Drawing Sheets

METHOD AND SYSTEM FOR VIDEO FRAME ENHANCEMENT USING EDGE DETECTION

BACKGROUND

1. Field

The present invention relates to video coding and/or decoding and, more particularly, to using edge detection to enhance video frames after coding/decoding.

2. Background Information

As is well-known, transform-based video coding and/or decoding introduces artifacts in the decoded video frames, such as blocking, ringing, etc. Lower bit-rate video coding and/or decoding typically results in increased visibility of these coding artifacts. In this context, Post-processing may be used to reduce the visibility of the coding artifacts; however, a need exists for improving the effectiveness of these post-processing techniques.

SUMMARY

Briefly, in accordance with one embodiment of the invention, a video processing system includes: a video coder. The video coder includes the capability to generate an edge detection map along a predetermined direction for an uncoded frame that is to be coded.

Briefly, in accordance with another embodiment of the invention, an article includes: a storage medium having stored thereon instructions capable of being executed by a system that when executed result in: producing an edge detection map along a predetermined direction from the video frame prior to coding; and coding the edge detection map and the video frame.

Briefly, in accordance with one more embodiment of the invention, a method of processing a video frame includes: producing an edge detection map along a predetermined direction from the video frame prior to coding; and coding the edge detection map and the video frame.

Briefly, in accordance with still one more embodiment of the invention, a video processing system includes: a video frame processor to generate an edge detection map from an uncoded video frame to be coded, the video frame processor further including the capability to code the edge detection map.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

As previously indicated, low bit-rate video coding and/or decoding increases the visibility of coding artifacts, but post-processing may be employed to reduce the visibility of these artifacts. Typically, coding is employed to compress images for transmission over a limited bandwidth communications channel, although, not always, and, of course, the invention is not limited in scope in this respect. Post-processing techniques, in general, attempt a balance between blurring, introduced by filtering coded artifacts from the video frame, and the visibility of these artifacts in the displayed video frame or image. Examples of such post-processing includes proposed techniques for coding noise removal for MPEG-4 video ISO/IEC 14496-2 and similar approaches suggested for H.263+, ITU-T Recommendation Version 2, 1998, both available from the International Telecommunications Union (ITU). Typically, these techniques have drawbacks, however.

Figure 2:
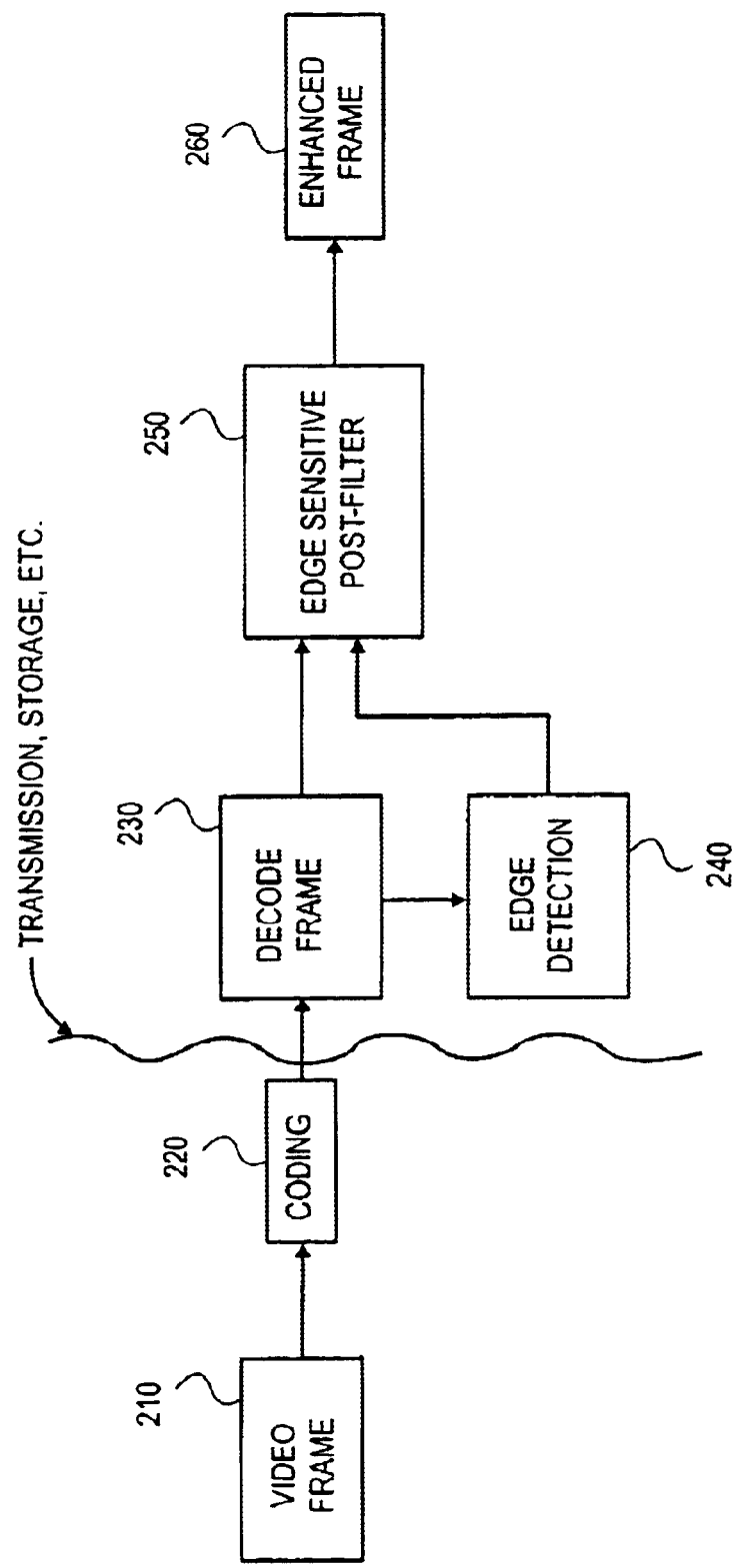
FIG. 2 is a block diagram of an embodiment of a prior art system for coding and/or decoding video frames using edge detection.

At times, signal information about spatial detail in the original video frame is not correctly inferred. This may occur because local image edge detection is performed on the decoded video frame, as illustrated in FIG. 2, for example, and typically high frequency signal information has been attenuated due to quantization and other processing performed to code or compress the video frame. Moreover, compression artifacts may manifest themselves as "spurious" signal information with fine spatial detail, confusing the inference process. For example, as illustrated by embodiment 200 in FIG. 2, after coding the video frame, as illustrated by block 220, the coded signals are transmitted via a communications channel(not shown). For example, this communications system may be a wireline or wireless communications system, it may be point-to-point, broadcast, multi-cast, packet-switched, or circuit-switched, to provide a few examples. Then, as illustrated by block 230, the video frame is decoded at the far end from the received signals and edge detection is performed on the decoded frame, as illustrated by block 240. Edge detection signal information is provided, along with the decoded frame, in this example, to perform edge sensitive post-filtering, as indicated by block 250, which may ultimately produce an enhance video frame 260. However, because in this example, the edge detection information is generated from the decoded or decompressed frame, high frequency signal information may have been attenuated in the decoded frame, resulting in lower quality edge detection signal information being produced.

Another disadvantage associated with these approaches is that the post-processing techniques employed are typically computationally complex and may impose a burden at the far end of the communications channel. Typically, this complexity is increased as a result of compression induced coding noise present in the edge detection phase and/or the difficulty of generating local edge signal information from the decoded video frame.

Figure 1:
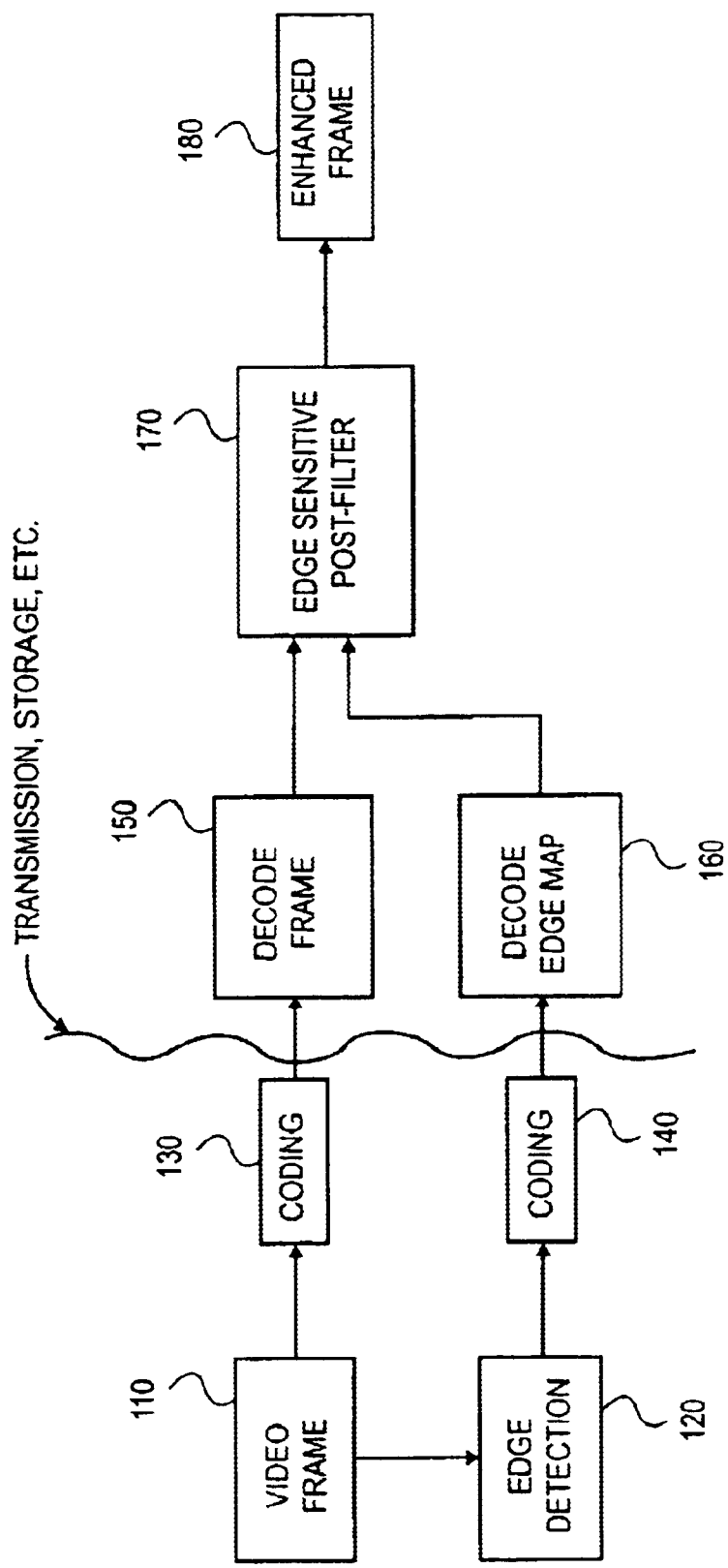
FIG. 1 is a block diagram illustrating an embodiment of a system for coding and/or decoding video frames using edge detection in accordance with the invention.

Although the invention is not limited in scope to the embodiment illustrated in FIG. 1, embodiment 100, as one example, addresses these drawbacks. Video quality improvement provided by post-processing may be increased by making available to the post-processor reliable signal information about object edges in the video frame. This may be accomplished by using signal information generated prior to video coding. This signal information may then be employed to adapt or modify the filtering effects in regions with different degrees of spatial detail, as explained in more detail below. Furthermore, the computational complexity of post-processing is decreased, relatively speaking, since edge signal information is not generated during post-processing, in comparison with alternative approaches.

Referring now to FIG. 1, embodiment 100 is a block diagram illustrating an embodiment of a video processing system in accordance with the present invention. As illustrated, this embodiment includes a video coder, including the capability to generate an edge detection map along a predetermined direction for an uncoded frame that is to be coded. Therefore, for the embodiment illustrated in FIG. 1, it is assumed that the edge detection is performed as part of the video coding, although the invention is not limited in scope in this respect. It will, of course, be appreciated, that the invention is not limited in scope to use with any particular form of coding and/or decoding. For example, MPEG-4, H.263+, or any one of a number of other approaches may be employed. The edge detection signal information in this embodiment that will be employed for post-processing, however, in this embodiment, is obtained using the original video frame, in comparison with alternative approaches. Therefore, as illustrated in FIG. 1, edge detection processing 120 is applied to video frame 110 before the video frame is coded, as indicated by block 130. For video frames in YUV color space format, also referred to as YCrCb format, an edge detection map may be produced from one of the two chroma planes, that is U or V, to utilize a correlation between edges in the chroma plane and physical object edges, although the invention is not limited in scope in this respect, or to the use of video frames in YUV color space format. More specifically, many other formats may be employed, and, even where the YUV color space format is employed, many other approaches to edge detection may be employed. However, for this particular embodiment, this process produces a binary-edge mask or edge detection map, as detailed below.

The edge detection is done along a predetermined direction in this embodiment. The horizontal direction and the vertical direction may be utilized, although the invention is not limited in scope in this respect. Therefore, any direction may be employed, such as, for example, the diagonal direction. Likewise, one, two, or more edge detection maps may be employed. Of course, more edge-detection maps should produce better results, but at a greater cost in terms of resources. For example, where the edge detection maps are to be transmitted, both computational resources and bandwidth resources are consumed. Edge detection is performed on a pixel-by-pixel basis for a given video frame in this particular embodiment, although, again, the invention is not restricted in scope in this respect. It is, of course, assumed, for this particular embodiment, that the video frame comprises a digital image with each pixel location having color space signal information in a binary digital signal format, although the invention is not limited in scope in this respect. Of course, any one of a number of color space coordinate systems may be used, and the invention is not limited in scope to a particular color space coordinate system. Furthermore, the invention is not limited in scope to employing video frames having color space signal information and, therefore, a gray scale image may, likewise, be processed in this manner, for example. Furthermore, any storage format may be employed to store the associated signals.

Figure 3:
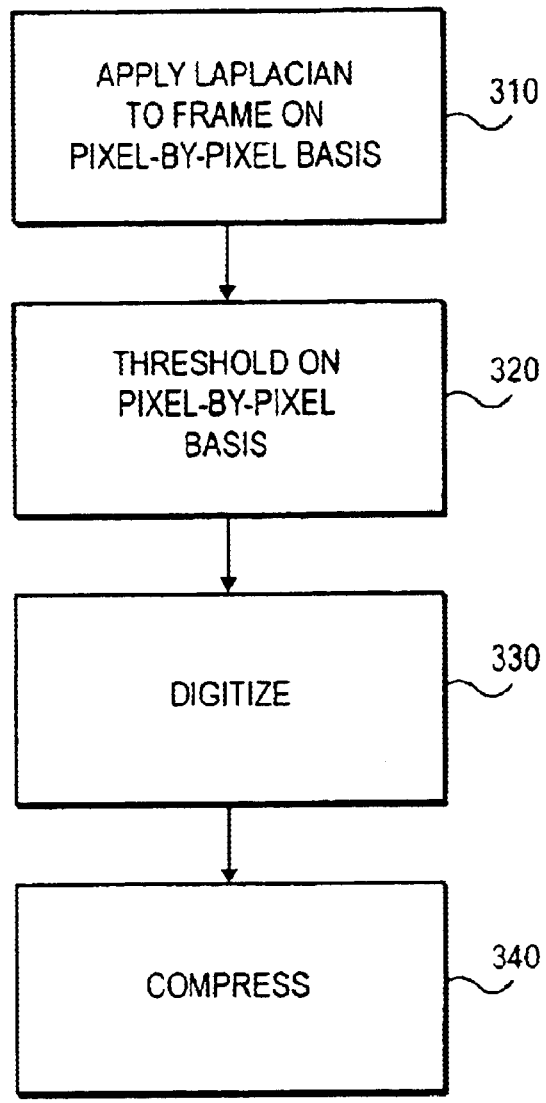
FIG. 3 is a flowchart illustrating an embodiment of a process for producing an embodiment of an edge detection map in accordance with the present invention.

In one embodiment, traditional techniques of image processing, such as, for example, the LAPLACIAN edge detection matrix may be applied, although the invention is not limited in scope in this respect. As is well-known, the effect of applying this matrix is to sharpen the edges present in the video frame along a particular direction. Of course, any one of a number of other approaches for signal detection may alternatively or in addition be employed. For example, although the invention is not limited in scope in this respect, a variety of well-known operators for use in signal processing are described in Section 7.4, Spatial Operations, and in Section 7.4, Edge Detection, of the Textbook *Fundamentals of Digital Image Processing* by Anil Jain, published by Prentice Hall, ISBN: 0133361659. Once the LAPLACIAN has been applied on a pixel-by-pixel basis to the video frame, this produces a frame of signal values. Thresholding may then be applied to each pixel and, depending upon whether the signal value in a particular pixel location exceeds the threshold or not, a binary signal value may be assigned to that location. Of course, alternative techniques other than simple thresholding may also be employed. In this particular embodiment, this frame or matrix of binary values comprises the binary-edge mask or edge detection map. As illustrated in FIG. 1 by block 140, this edge detection map may then be coded or compressed for transmission via a communications channel. The process described above for this particular embodiment is illustrated in FIG. 3, although the invention is not limited in scope in this respect.

Although the invention is not limited in scope in this respect, it is envisioned that an edge detection map may be transmitted as supplemental signal information corresponding to a coded video frame. Therefore, at the far or receiving end of the communications channel, depending upon the capabilities of the decoder, this edge detection map may or may not be employed to enhance the decoded video frame, as described in more detail for this embodiment below. Likewise, in addition to transmitting one edge detection map, in alternative embodiments, multiple edge detection maps may be transmitted, as previously indicated. For example, in this particular embodiment, a horizontal and a vertical edge detection map may be transmitted. Therefore, the previously described edge detection process would be applied to the video frame to produce a horizontal edge detection map and to produce a vertical edge detection map. Of course, in this embodiment, the LAPLACIAN to be applied is modified to reflect the direction in which the edge detection is performed.

It is noted that although in this particular embodiment the edge detection processing is performed in a spatial domain, the invention is not limited in scope in this respect. Edge detection processing may be performed in any suitable domain desired. For example, a video frame may be transformed to the frequency domain and high frequency signal information may be extracted to perform the desired edge detection. Once this has occurred, an inverse transformation back to the spatial domain may take place and the edge detection map may be produced and coded for transport via a communications channel.

It is, likewise, noted that any one of a number of coding or compression schemes may also be employed to compress the edge detection map. For example, a lossy or lossless compression scheme may be employed. It will appreciated that the choice of compression scheme may vary with a variety of factors, such as available bandwidth, available processing capability, etc. As one example, differential encoding, such as DPCM encoding, may be employed. Again, the invention is not limited in scope to any in particular coding and/or compression scheme.

Once the encoded video frame and edge detection map have been received at the far end of the communications channel, they may be decoded to produce a representation of the original wide frame and a representation of the originally generated edge detection map. Typically, the inverse of the process performed to code or compress the video frame and edge detection map is performed in order to decode or decompress the video frame and edge detection map.

In addition to applying this technique to transit video frames via a communications channel and enhance the received coded video frame, this technique may also be employed to store video frames for playback, in an alternative embodiment. In such an embodiment, of course, the video frame and edge detection map after coding are not transmitted via a communications channel, nonetheless, they may be stored, such as on a hard drive or other storage medium and then may be read when it is desired to view the video frame. An advantage of this approach is better utilization of limited storage capacity. The processing employed in this particular embodiment may, therefore, be substantially similar to that employed in an embodiment in which transmission via a communications channel occurs. It is also appreciated that, although in one embodiment edge detection signal information, such as an edge detection map, may be transmitted separately, likewise, it may be transmitted as part of a coded bit stream for the associated video frame in an alternative embodiment. Therefore, in a playback system, an edge detection map may be stored with or separately from the associated video frame. Many such transmission or storage possibilities are available.

Once the video frame and edge detection map have been decoded, one or more edge detection maps may be employed to make determinations regarding post-filtering of the decoded video frame. For example, in one embodiment, a sharpening or high pass filter may be applied on a pixel-by-pixel basis to those pixels indicating edge signal information in the corresponding edge detection map of the video frame. More specifically, in this particular embodiment, if vertical edge signal information is indicated, then a one-dimensional vertical sharpening filter may be applied to the pixel. If horizontal edge detection signal information is indicate, then a one-dimensional horizontal sharpening filter is applied, and if both horizontal and vertical edge signal is indicate, then a two-dimensional sharpening filter is applied. For example, the edge detection maps each contain bits in particular locations. These bits provide information at the far end regarding the presence of edges in the original frame. This signal information may now be used at the far end to apply sharpening filters to enhance the edges in selected locations, in this embodiment. In this particular embodiment, the sharpening filter comprises the LAPLACIAN, as previously described, or a scaled version of the LAPLACIAN. However, the invention is not limited in scope in this respect. Any one of a number of sharpening filters may be applied, such as those provided in the previously referenced text *Fundamentals of Digital Image Processing*. Furthermore, instead of a sharpening filter, a smoothing filter may alternatively be applied, depending upon the embodiment, as indicated below, for example. Furthermore, in an alternative embodiment, the user may select a desired amount of smoothing and/or sharpening and, depending upon the user selection, different amounts of smoothing and/or sharpening may be applied to the video frame based, at least in part, on the edge detection map received and decoded. For example, although the invention is not limited in scope in this respect, a sliding scale may be implemented in software that provides the user the ability to modify the smoothing and/or sharpening and observe the results on the video frame or frames to select the amount that is pleasing to the user for that situation.

As previously indicated, depending upon the processing capability at the far end, the edge signal information may be ignored or different amounts of processing may be employed. For example, although in one embodiment, to decode or upsample the edge detection map a simple zero order hold interpolation filter may be employed, more sophisticated interpolation processing may be employed based an the edge detection map and depending upon the processing capability at the far end. Presence of this additional information in the form of one or more edge detection maps, of course, in no way inhibits the capability to decode the compressed video frame at the far end of the communications channel. For example, in one embodiment, a coded bit stream may be provided in which the coded edge detection map signal information is provided with the coded frame in a layered approach so that the where greater processing and/or bandwidth capability exists, greater amounts of signal information may be received and employed to perform the video frame processing.

Many alternative embodiments in accordance with the invention are possible, and the invention is not restricted in scope to any one particular embodiment. For example, embodiments may include a video processing system, a method of processing a video frame, and a storage medium have instructions stored thereon that when executed by a system, such a personal computer, for example, results in an embodiment of a method of processing a video frame in accordance with the present invention being executed.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A video processor system comprising:

a video coder, to generate an edge detection map along a predetermined direction for an uncoded frame that is to be coded, to code said uncoded frame, and to compress the edge detection map, wherein the edge detection map is compressed separately from the coded frame wherein the video processor system codes the edge detection map for transmission along with an associated video frame that is not edge detected.

2. The video processing system of claim 1, wherein the predetermined direction comprises one of the vertical and horizontal direction.

3. The video processing system of claim 1, and further comprising a video decoder.

4. The video processing system of claim 3, wherein the video decoder includes an edge-sensitive post-filter to enhance a decoded video frame based, at least in part, on a decoded edge detection map associated with the decoded frame.

5. A video processing system comprising:

a video frame processor to generate an edge detection map from an uncoded video frame to be coded, to code said uncoded video frame, and to code the edge detection map, wherein the video processing system codes the edge detection map for transmission along with an associated video frame that is not edge detected.

6. The video processing system of claim 5, wherein the video processing system codes the edge detection map for transmission via a communications channel separately from an associated video frame.

7. The video processing system of claim 5, wherein the processing system codes the edge detection map for storage along with an associated coded video frame.

8. The video processing system of claim 5, wherein the video processing system codes the edge detection map for storage separately from an associated coded video frame.

9. A method of processing a video frame comprising:

producing an edge detection map along a predetermined direction from the video frame prior to coding;

coding the edge detection map and the video frame; and transmitting the edge detection map along with an associated video frame that is not edge detected.

10. The method of claim 9, wherein the predetermined direction comprises one of a horizontal direction and a vertical direction.

11. The method of claim 9, wherein producing an edge detection map includes producing more than one edge detection map along more than one direction; and wherein coding includes coding the more than one edge detection map.

12. The method of claim 11, and further comprising:

decoding the coded edge detection maps and video frame.

13. The method of claim 12, wherein decoding includes applying an edge-sensitive post-filter, the edge-sensitive post-filter including the capability to enhance a decoded video frame based, at least in part, on decoded edge detection maps associated with the decoded frame.

14. The method of claim 9, and further comprising:

decoding the coded edge detection map and video frame.

15. The method of claim 14, wherein decoding includes applying an edge-sensitive post-filter including the capability to enhance a decoded video frame based, at least in part, on a decoded edge detection map associated with the decoded frame.

16. The method of claim 15, further comprising: storing the coded video image and edged detection map before decoding.

17. The method of claim 15, and further comprising: transmitting the coded video image and edge detection map via a bandwidth limited communications channel prior to decoding.

18. An article comprising: a storage medium having stored therein instructions capable of being executed by a system that when executed result in:

producing an edge detection map along a predetermined direction from the video frame prior to coding;

coding the edge detection map and the video frame; and transmitting the edge detection map along with an associated video frame that is not edge detected.

19. The article of claim 18, wherein the predetermined direction comprises one of a horizontal direction and a vertical direction.

20. The article of claim 18, wherein producing an edge detection map includes producing more than one edge detection map along more than one direction; and wherein coding includes coding the more than one edge detection map.

21. The article of claim 20, and further comprising:

decoding the coded edge detection maps and video frame.

22. The article of claim 21, wherein decoding includes applying an edge-sensitive post-filter to enhance a decoded video frame based, at least in part, on decoded edge detection maps associated with the decoded frame.

23. The article of claim 21, wherein decoding includes applying an edge-sensitive post-filter to enhance a decoded video frame based, at least in part, on decoded edge detection maps associated with the decoded frame.

24. The article of claim 18, further comprising:

decoding the coded edge detection map and video frame.

25. The article of claim 24, wherein decoding includes applying an edge-sensitive post-filter to enhance a decoded video frame based, at least in part, on a decoded edge detection map associated with the decoded frame.

26. The article of claim 25, and further comprising:

storing the coded video image and edged detection map before decoding.

27. The article of claim 25, and further comprising:

transmitting the coded video image and edge detection map via a bandwidth limited communications channel prior to decoding.

* * * * *

UNITED STATES PATENT AND TRADEMARK OFFICE
CERTIFICATE OF CORRECTION

PATENT NO. : 6,898,319 B1
DATED : May 24, 2005
INVENTOR(S) : Hazra et al.

It is certified that error appears in the above-identified patent and that said Letters Patent is hereby corrected as shown below:

Column 6,
Line 8, delete "an" and insert -- on --.

Signed and Sealed this

Twenty-third Day of August, 2005

JON W. DUDAS
*Director of the United States Patent and Trademark Office*